UNITED STATES PATENT OFFICE.

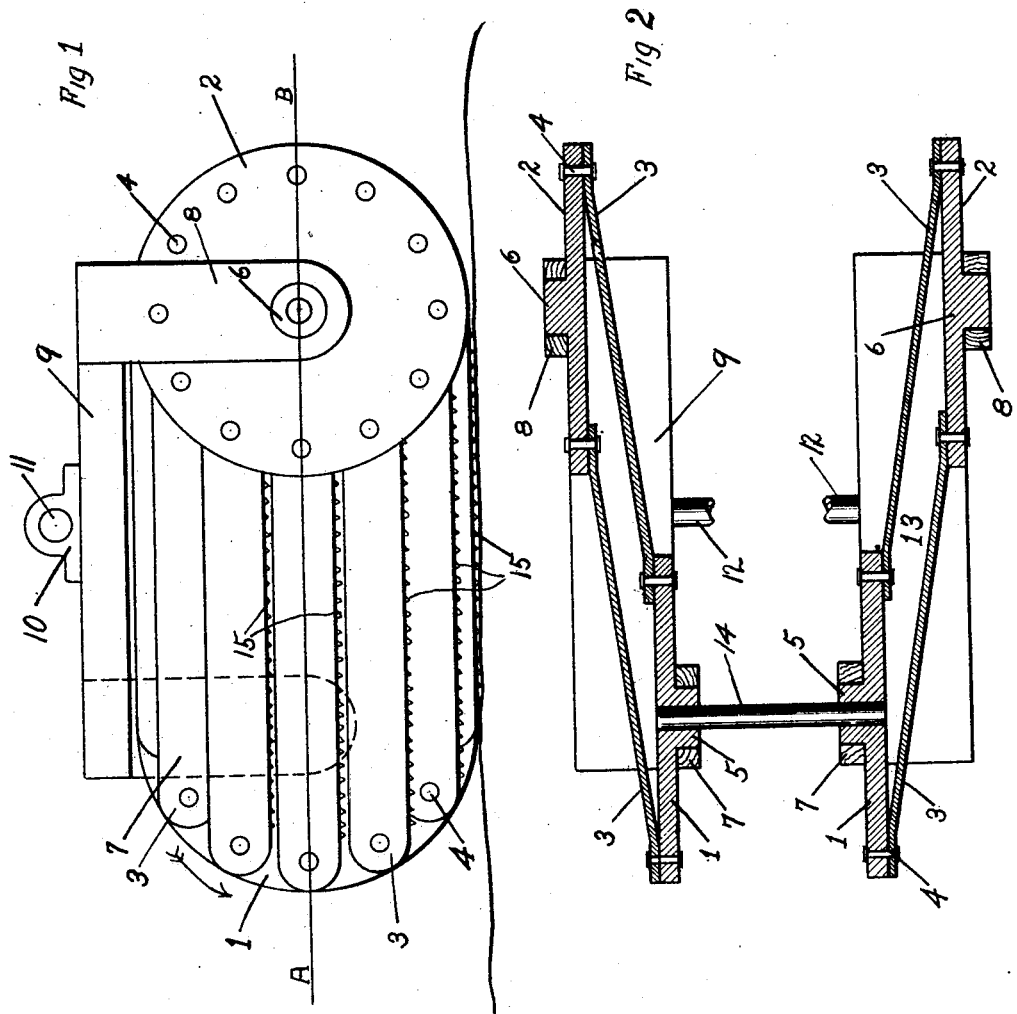

EDWIN J. GOULD, OF OAKLAND, CALIFORNIA, ASSIGNOR OF ONE-TENTH TO R. M. BROOKS, OF SAN FRANCISCO, CALIFORNIA.

FLAT-WHEEL TRACTOR.

1,396,194.  Specification of Letters Patent.  Patented Nov. 8, 1921.

Application filed July 28, 1920. Serial No. 399,558.

*To all whom it may concern:*

Be it known that I, EDWIN J. GOULD, a citizen of the United States, residing at Oakland, county of Alameda, State of California, have invented certain new and useful Improvements in Flat-Wheel Tractors, whereof the following is a specification.

My invention relates to improvements in flat wheel tractors of the creeper or track laying type, and the object of my invention is to provide a wheel with a flat elongated large tractive surface with no links or joints in contact with the ground, to eliminate a multiplicity of bearing joints with their consequent friction, wear, and liability of breakage, to allow greater speed and mobility in the tractor, and at the same time to retain all the advantages of a large flat-tractive surface.

I attain these objects by the mechanism illustrated in the accompanying drawings in which:

Figure 1. is a side view in elevation of the entire device.

Fig. 2. is a horizontal sectional view at the line *a—b* showing the upper section of the device, and showing the frame in elevation.

Similar numerals refer to similar parts throughout the several views.

Nos. 1 and 2 are wheels placed one in advance of the other, with a space between their adjacent parallel sides, 3 are traction bars extending diagonally from the face of wheel 1 near its circumference to the same relative point on adjacent face of wheel 2, as shown in Fig. 2, 4 are bearing studs revolubly connecting the ends of traction bars 3 to the faces of wheels 1 and 2, 5 is a hub extending from the center of wheel 1 on the side farthest from wheel 2, and 6 is a hub on wheel 2 extending in the direction away from wheel 1. 7 is an upright support with its lower end bearing on hub 5. 8 is a similar support with its lower end bearing on hub 6. The supports 7 and 8 are solidly joined at their upper ends to a frame 9 extending over the wheels 1 and 2, and having attached near its middle a boxing 10, which receives a spindle 11 on the end of a crossbar 12 connecting with an identical traction unit 13 on the oposite side of the tractor in the same maner, as shown in Fig. 2. When the wheels form part of a self-propelled vehicle wheel No. 1 is attached to the corresponding wheel on the opposite side of the tractor by a drive axle 14. 15 are grousers attached to traction bars 3.

In operation when power is applied to drive axle 14 to rotate the pair of wheels to which it is attached forward in the direction shown by the arrow in Fig. 1, the traction bar 3 which at that time connects wheels 1 and 2 by the bearing studs nearest the top of their rims moves forward and downward in unison with the rotation of the wheels in the well known manner of the connection bar of locomotive drive wheels, until the bearing studs to which its ends are pivoted, reach such a point in the revolution of the wheels as to bring the traction bar 3 in contact with the ground where it adds its tractive power and support of the vehicle to that of the wheels. As the wheels further revolve traction bar 3 is lifted almost directly up from the ground for its entire length and at a completion of a full revolution of the wheels 1 and 2 regains its original position at the top of the wheels, being at all parts of the revolution parallel to a line drawn from the center of wheel 1 to the center of wheel 2. The action of all the traction bars being identical as soon as one leaves the ground another almost immediately takes its place, their slant and off-set, and the space between the faces of wheels 1 and 2 allowing them to pass and overlap each other, so that there is always one in full contact with the ground, one coming into contact with the ground and one just leaving the ground at all times, making their tractive and supporting power continuous.

The bearing studs are placed at such distance from the rims of the wheels 1 and 2, and at such equal distances apart around the wheels, as to cause the traction bars to have a clearance between their edges when in the position near the center of the wheels, and to bring the lower edges of three of them nearly on the same horizontal plane when near the bottom of the wheels as plainly shown in Fig. 1.

By the description previously given of the action of the traction bars in unison with the wheels, it will be clear that the grousers attached to the bars are pressed vertically into the ground and raised vertically from the ground without any prying motion.

Each grouser therefore has the advantage of a solid pulling surface. The device is simple in construction and capable of running at high speed without excessive noise and vibration.

I do not confine myself in the construction of this device or in these specifications to the meaning of the word tractor in its more restricted sense, but include the adaptability of these wheels to any vehicle whether self-propelled or not.

Having thus described my invention what I claim as new is:

1. The combination in a flat wheel tractor, of two wheels, bearing studs extending from one face of each wheel, traction bars extending diagonally from the face of one wheel to the adjacent face of the other wheel, being pivotally attached to said bearing studs. hubs extending from the center of said wheels on their sides opposite to the bearing studs, standards in which said hubs are revolubly mounted, and a frame solidly connecting said standards, all substantially as set forth.

2. The combination in a flat wheel tractor of two wheels mounted on the opposite ends of a live axle constituting the driving member, two other wheels constituting the driven members diagonally connected to the two first named wheels by traction bars, bearing pivots extending from the faces of said wheels near their circumferences, pivotally connecting the ends of said traction bars to the adjacent faces of said wheels, hubs extending from all of said wheels, a frame resting on said hubs in such a manner as not to interfere with the action of the said traction bars, and grousers attached to the tractive surface of said traction bars, substantially as described.

3. In a flat wheel tractor wheels having their adjacent faces parallel to each other. bearing pivots extending from said adjacent faces, traction bars having their ends revolubly attached to said bearing studs the said wheels so placed as to cause the said traction bars to pass diagonally from one wheel to the other, hubs extending from said wheels on the side opposite that to which traction bars are attached and a frame resting on said hubs connecting one wheel with the other, substantially as set forth.

4. The combination in a flat wheel tractor of two wheels one in advance of the other, with their adjacent faces parallel, bearing pivots extending from said adjacent faces of said wheels near their circumferences. traction bars running diagonally from one wheel to the adjacent face of the other, the ends of said traction bars being mounted on said pivots, grousers attached to the under surface of said traction bars, the bearing pivots being placed in the faces of said wheels at such equal distances apart as to cause the grousers attached to any one traction bar to begin entering the ground while the grousers of another traction bar are at full depth in the ground, and grousers of a third traction bar are leaving the ground at one and the same time, all the grousers attached to the said traction bars being driven in and raised from the ground vertically, all substantially as set forth.

In testimony that I claim the foregoing, I have hereunto set my hand in the presence of two witnesses, this 20th day of July, 1920.

EDWIN J. GOULD.

Witnesses:
 EDMUND BOW,
 E. A. WINSTON.